(No Model.)
W. BEAM.
CULTIVATOR.
No. 599,093.                    Patented Feb. 15, 1898.
Fig. 1.
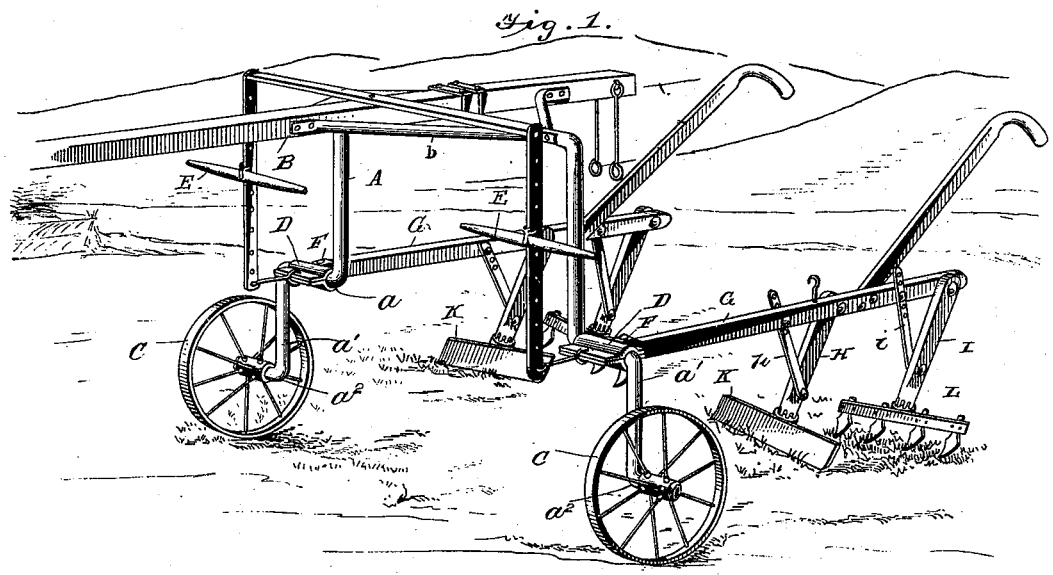
Fig. 2.
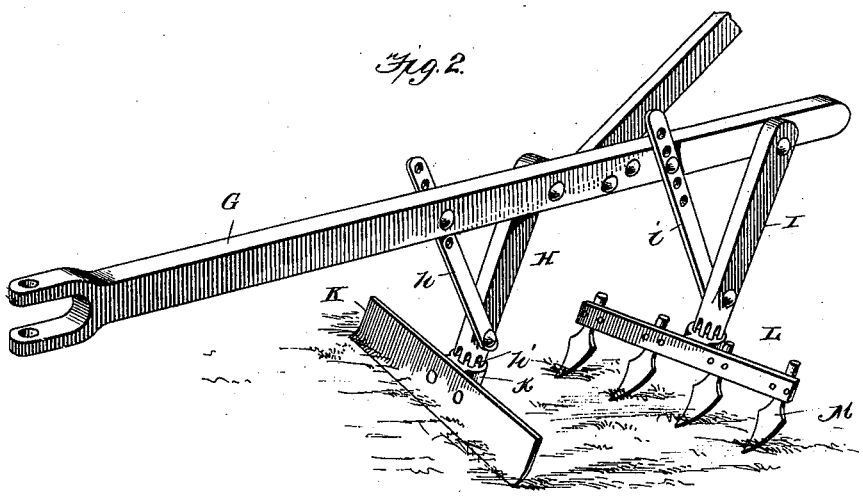
Fig. 3.      Fig. 4.
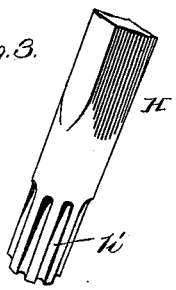   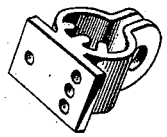
WITNESSES:
J. C. Shaw
Chas. F. Brock
INVENTOR
Waldo Beam,
BY
O'Meara & Co.
ATTORNEYS

United States Patent Office.

WALDO BEAM, OF COTTON HILL, ILLINOIS.

CULTIVATOR.

SPECIFICATION forming part of Letters Patent No. 599,093, dated February 15, 1898.

Application filed June 18, 1896. Serial No. 596,043. (No model.)

*To all whom it may concern:*

Be it known that I, WALDO BEAM, residing at Cotton Hill, in the county of Sangamon and State of Illinois, have invented a new and Improved Cultivator, of which the following is a specification.

This invention relates generally to cultivators, particularly to an improved wheel-cultivator, and more especially to that class known as "straddle-row" cultivators.

The object of the invention is to provide a cultivator simple in construction and composed of but a few inexpensive parts.

With this and other objects in view my invention consists in the peculiar construction of the various parts and in their novel combination or arrangement, all of which will be fully described hereinafter and pointed out in the claim.

In the drawings forming a part of this specification, Figure 1 is a view showing the invention in use. Fig. 2 is a view of beam and attached parts. Figs. 3 and 4 show details of construction.

In carrying out my invention I employ an arch-beam A, to which the draft pole or tongue B is attached, said draft pole or tongue being securely braced by means of the brace-rods $b$.

The beam A is formed with horizontal portions $a$ at each side of the arch, extending laterally outward, and at the end of the portions $a$ the beam is bent downward at $a'$ and then horizontally outward again, as at $a^2$, and mounted upon the ends $a^2$ are the wheels C, and by projecting the ends $a^2$ so close to the ground I am enabled to use very small draft-wheels, so that the horses can be attached to the arch, and the said draft-wheels will not interfere with them in the least.

In order to attach the draft appliances, I arrange sleeves or boxes D upon the horizontal portions $a$ of the arch-frame, and to the forward side of said sleeves or boxes I pivotally connect the whiffletree E, and to the rear side thereof I pivotally connect the couplings F, by means of which the cultivator-beams G are attached to the arch-beam of the cultivator-frame.

The coupling F is of the usual pattern, so that the cultivator-beam can be adjusted both vertically and horizontally, and, furthermore, the said beam will have the pivotal movement both vertically and horizontally, or, in other words, a universal movement.

Attached to the cultivator-beams G are the front and rear standards H and I, said standards being pivoted at their upper ends and adjustably braced by means of the adjustable brace-rods $h$ and $i$, respectively, said rods and standards each having a series of perforations by means of which said adjustment can be accomplished.

At the lower end of the forward standard H is attached a scraper or sweep blade K, while at the lower end of the rear standard I is attached a tooth-bar L, to which is connected a series of cultivator-teeth M.

The scraper or sweep blade K is adapted to be adjusted at any angle with reference to the line of draft, and in order to accomplish said adjustment I corrugate the lower end of the standard H, as shown at $h'$, which corrugated end is adapted to fit within the split collar $k$, attached to the rear face of the scraper or sweep blade K, the interior face of said split collar being corrugated, as shown, in order to receive the corrugated end of the standard, and in order to securely bind the parts together after they have been properly adjusted I employ a clamping-screw. By this construction it will be seen that I can adjust the scraper or sweep blade to throw the material to either the right or the left, as desired, and as the lower edge of said blade is sharpened and the entire blade arranged on a vertical angle it is clear that as the device is drawn forward the said blade will cut away the roots or stalks left standing, and thereby clear the space for the action of the cultivators which follow directly behind.

The tooth-bar carrying the cultivator-teeth is attached to its standard by means of the split collar and clamp-screw, the same as the scraper-blade, and, if desired, each tooth can be attached in substantially the same manner, thereby permitting an independent adjustment of each tooth.

It will thus be seen that I provide an exceedingly cheap and simple form of straddle-row cultivator, one in which I can employ very low draft-wheels, so that the said wheels will not interfere with the horses, and whereby I am enabled to use very short cultivator-beams, thereby applying the draft in the most direct manner.

It will also be seen that the field to be cultivated is effectively cleared of all stalks and rubbish prior to the action of the cultivator-teeth upon the soil, thereby rendering the action of said teeth more effective and preventing the entanglement of roots and stalks with the said teeth.

It will also be noticed that all of the various parts are readily adjusted, whereby any required adjustment occasioned by any peculiarity in the soil or for any other reason can be readily had.

Having thus described my invention, what I claim as new, and desire to secure by Letters Patent, is—

The herein-described cultivator, consisting of the arch-beam A, formed with the horizontal portions $a$, $a^2$, and the vertical portion $a'$ connecting the horizontal portions $a$ $a^2$, the wheels C mounted upon the horizontal portions $a^2$, the tongue B secured to the top of the arch-beam, the cultivator-beams G hinged to the horizontal portions $a$ of the arch-beam to swing vertically and laterally, standards H, I, pivoted to the rear end of each cultivator-beam, braces $h$, $i$, pivoted to the said standards and adjustably connected with the cultivator-beams, scraper-blades K adjustably secured to the front standards, and tooth-bars L adjustably secured to the rear standards, substantially as shown and described.

WALDO BEAM.

Witnesses:
 CHAS. H. CAREY,
 M. A. CHRISTY.